US012779520B2

(12) United States Patent
Ishitani et al.

(10) Patent No.: US 12,779,520 B2
(45) Date of Patent: Nov. 3, 2026

(54) PROCESSING TOOL

(71) Applicant: SUGINO MACHINE LIMITED, Namerikawa City (JP)

(72) Inventors: Akihiro Ishitani, Namerikawa City (JP); Mitsuru Muto, Namerikawa City (JP); Masahide Yamazaki, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 764 days.

(21) Appl. No.: 18/175,237

(22) Filed: Feb. 27, 2023

(65) Prior Publication Data

US 2023/0278090 A1 Sep. 7, 2023

(30) Foreign Application Priority Data

Mar. 1, 2022 (JP) ................................ 2022-030787

(51) Int. Cl.
*B21D 28/34* (2006.01)
*B21D 19/00* (2006.01)
(Continued)

(52) U.S. Cl.
CPC ........... *B21D 19/005* (2013.01); *B21D 28/34* (2013.01); *B23B 31/1071* (2013.01)

(58) Field of Classification Search
CPC .. B21D 19/005; B21D 28/34; B23B 31/1071; B23B 31/20; B23B 2270/027;
(Continued)

(56) References Cited

U.S. PATENT DOCUMENTS 4,197,886 A * 4/1980 MacDonald ........ B23B 31/1071 408/56
6,561,523 B1 * 5/2003 Wienhold ........... B25B 23/0035 279/75

(Continued)

FOREIGN PATENT DOCUMENTS

JP S54-009074 A 1/1979
JP S60-142040 U 9/1985

(Continued)

OTHER PUBLICATIONS

Office Action mailed on Oct. 11, 2022 in a corresponding Japanese Patent Application No. 2022-030787 (9 pages).

*Primary Examiner* — Sara Addisu
(74) *Attorney, Agent, or Firm* — United IP Counselors, LLC

(57) ABSTRACT

Provided is a processing tool capable of sliding a tool relative to a shank with a simple structure, to which a tool holder is detachably attached. The processing tool to which the tool is detachably attached, includes: a body; a spindle including tool holder holding hole, a first anti-rotation body holding hole; a cover including a pressing surface and a relief portion; a tool holder detachably inserted into the tool holder holding hole, the tool holder including a first anti-rotation groove, a tool holding hole, and a first spring holding hole, an anti-rotation body movable between the first anti-rotation groove and the pressing surface, the anti-rotation body accommodated in the relief portion when the cover is located at the detachable position and the tool holder is removed from the tool holder holding hole; and an elastic member to urge the tool holder toward distal end.

15 Claims, 8 Drawing Sheets

(51) Int. Cl.
*B23B 31/02* (2006.01)
*B23B 31/107* (2006.01)

(58) Field of Classification Search
CPC ......... B23B 31/083; B23B 51/00; B23C 3/12; B23C 3/126; B23C 5/10; B24B 9/00; B24B 41/04; B24B 9/02; B24B 47/12
See application file for complete search history.

(56) References Cited

U.S. PATENT DOCUMENTS

| | | | | |
|---|---|---|---|---|
| 6,920,810 | B1 * | 7/2005 | Thompson | B25G 3/26 81/177.85 |
| 6,953,196 | B1 * | 10/2005 | Huang | B25B 23/0035 81/177.85 |
| 6,966,730 | B1 * | 11/2005 | Miyanaga | B23B 31/1071 279/155 |
| 7,469,909 | B2 * | 12/2008 | Strauch | B25B 23/0035 279/143 |
| 2008/0190251 | A1 * | 8/2008 | Huang | B25B 23/0035 81/438 |
| 2014/0027987 | A1 * | 1/2014 | Wienhold | B25B 21/007 279/74 |
| 2021/0107071 | A1 * | 4/2021 | Muto | B23C 3/12 |
| 2021/0308842 | A1 * | 10/2021 | Abbott | B25B 23/0035 |
| 2023/0124359 | A1 * | 4/2023 | Yanagihara | B23B 31/1071 279/79 |
| 2023/0278090 | A1 * | 9/2023 | Ishitani | B23B 31/1071 |
| 2024/0399467 | A1 * | 12/2024 | Yanagihara | B23B 31/028 |
| 2025/0083343 | A1 * | 3/2025 | Yanagihara | B26B 29/02 |
| 2025/0296215 | A1 * | 9/2025 | Craig | B23B 31/1071 |

FOREIGN PATENT DOCUMENTS

| | | | |
|---|---|---|---|
| JP | 2000-015508 | A | 1/2000 |
| JP | 2003-145336 | A | 5/2003 |
| JP | 3609054 | B2 | 1/2005 |
| JP | 6025580 | B2 | 11/2016 |
| JP | 2021-062471 | A | 4/2021 |

* cited by examiner

PROCESSING TOOL

CROSS-REFERENCE TO RELATED APPLICATIONS

This application claims the benefit of priority to Japanese Patent Application No. 2022-030787, filed on Mar. 1, 2022, the entire contents of which are hereby incorporated by reference.

BACKGROUND

1. Technical Field

The present invention relates to a processing tool.

2. Description of the Background

A conventional a deburring tool is capable of adjusting pressing force of a cutting tool against a workpiece (for example, Japanese Patent No. 6025580). The conventional deburring tool includes a stem, a cutting tool guiding means, a spring member, and an initial length adjusting means. The stem is interposed in an axially movable manner relative to the shank. The cutting tool guiding means guides a cutting tool holding means in an axially movable manner relative to the stem to rotate integrally in the rotational direction. The spring member urges the cutting tool holding means in a direction that presses the workpiece against the stem. The initial length adjusting means adjusts the initial length of the spring member to adjust the pressing force of the spring member.

BRIEF SUMMARY

An object of the present invention is to provide a processing tool capable of sliding a tool relative to a body in an axial direction with a simple structure, to which a tool holder is detachably attached.

A first aspect of the present invention provides a processing tool to which a tool is detachably attached, the processing tool including:

- a body;
- a spindle rotatably supported by the body, the spindle including
  - a tool holder holding hole having an opening toward distal end, the tool holder holding hole extending along the spindle, and
  - a first anti-rotation body holding hole radially penetrating the spindle,
- a cover disposed at a distal end portion of the spindle, the cover configured to reciprocate along the spindle between a processing position and a detachable position, the cover including
  - a pressing surface configured to cover the first anti-rotation body holding hole at the processing position, and
  - a relief portion located on an inner surface of the cover, the relief portion being recessed radially outward;
- a tool holder detachably inserted into the tool holder holding hole, the tool holder including
  - a first anti-rotation groove located on an outer surface of the tool holder,
  - a tool holding hole located at a distal end portion of the tool holder, the tool is detachably installed into the tool holding hole, and
  - a first spring holding hole having an opening in a basal portion of the tool holder;
- a first anti-rotation body held in the first anti-rotation body holding hole when the cover is located at the processing position, the first anti-rotation body configured to move between the first anti-rotation groove and the pressing surface, the anti-rotation body configured to be accommodated in the relief portion when the cover is located at the detachable position and the tool holder is removed from the tool holder holding hole; and
- an elastic member disposed between the first spring holding hole and the tool holder holding hole to urge the tool holder toward distal end.

The processing tool is, for example, a deburring tool, a drilling tool, a threading tool, or a brush. The deburring tool is attached to a machining apparatus to remove burrs adhering to the workpiece. The machining apparatus is, for example, a lathe, a turning center, or a robot.

For convenience of explanation, the side to which a cutting tool or a brush is attached is referred to as the distal end, while the opposite side is referred to as the basal end.

A pressurized air inlet may be connected to the tool holder holding hole. At this time, the tool holder preferably includes an air flow path connecting the tool holder holding hole and the tool holding hole. The air flow path may have an outlet located around the tool holder holding hole. The tool holder may include a collet for holding the tool. The air flow path may be located within the collet. The pressurized air is, for example, compressed air supplied from a factory. The pressurized air may include a mist of a lubricating oil or a rust preventive oil.

The cover may include an umbrella portion covering a distal end portion of the spindle. The expansion chamber may be located in the umbrella portion. The cover may include a shaft. The packing may seal a gap between the shaft portion of the cover and the spindle.

The spindle may have a second elastic member holding hole located in the tool holder holding hole to hold the elastic member.

One or more first anti-rotation grooves may be arranged. The plurality of first anti-rotation grooves are arranged rotationally symmetrically with respect to the spindle. The first anti-rotation groove may extend parallel to the spindle. The first anti-rotation groove may have a spiral shape twisted in the rotation direction of the spindle toward the distal end.

One or more second anti-rotation grooves may be arranged. The plurality of second anti-rotation grooves are arranged rotationally symmetrically with respect to the spindle. Preferably, the second anti-rotation groove extends parallel to the spindle. The second anti-rotation groove may have a spiral shape twisted about the spindle toward the distal end.

For example, a balancing hole may be arranged in the spindle in order to achieve a rotational balance. The balancing hole is preferably combined with single first anti-rotation groove and single second anti-rotation groove.

The first anti-rotation body retaining portion prevents the first anti-rotation body from falling into the tool holder holding hole.

The spindle may have a second anti-rotation body retaining portion in the second anti-rotation body retaining hole. The second anti-rotation body retaining portion prevents the second anti-rotation body from falling into the tool holder holding hole.

For example, the motor is an electric motor or an air motor. When the motor is an air motor, the pressurized air inlet may be connected to the air motor. The processing tool may have an exhaust port. The air motor and the exhaust port may be arranged in combination. The compressed air introduced from the pressurized air inlet rotates the air motor. The exhaust gas from the air motor may be discharged from a gap between the cover and the body. Further, the exhaust gas from the air motor may be exhausted from the exhaust port of the tool holder holding hole. Further, when the processing tool has an air motor and an exhaust port, most of the exhaust gas from the air motor may be discharged from the exhaust port.

When the motor is an electric motor, the pressurized air may be dry air instead of mist air. The pressurized air may include two fluids, that is, mist air and dry air. In this case, the mist air may be supplied to the main bearing or the tool holder holding hole, and the dry air may cool the electric motor and be discharged from the exhaust port.

The spindle may include a first packing groove. The first packing groove is located on an outer surface of the spindle. The first packing groove is a circumferential groove.

The cover may include a second packing groove. The cover may include a shaft portion. The shaft portion has a hollow right-cylindrical shape. The shaft portion is inserted into a gap between the spindle and the body. The second packing groove is located on an inner surface of the cover. The second packing groove is a circumferential groove. The second packing groove may be located in a shaft portion of the cover. When the cover is at the processing position, the axial positions of the second packing groove and the first packing groove coincide with each other. At this time, the first packing groove and the second packing groove integrally form a single annular packing groove. The packing is attached in the first packing groove. When the second packing groove is located, the packing is attached between the first packing groove and the second packing groove.

Preferably, the anti-rotation body holding surface is inclined with respect to a line passing through the center of the anti-rotation body and orthogonal to the shank axis.

Preferably, the anti-rotation body holding surface is a cylindrical surface. Preferably, the center axis of the anti-rotation body holding hole does not pass through the center axis of the spindle. That is, the center axis of the anti-rotation body holding hole is in a twisted position with the center axis of the spindle.

Preferably, the anti-rotation body holding surface is inclined in the circumferential direction of the processing tool with respect to a line passing through the center of the anti-rotation body and orthogonal to the shank axis.

Preferably, in a state in which the anti-rotation body is in contact with the pressing surface of the cover and the anti-rotation groove, the center of the anti-rotation body is located in the anti-rotation body holding hole.

For example, the anti-rotation body is a ball. The anti-rotation body may be a pin.

The anti-rotation groove extends parallel to the shank axis. The anti-rotation groove may have a spiral shape that advances to the basal end in a direction opposite to the rotation direction of the deburring tool.

The processing tool according to the present invention is capable of sliding the tool relative to the body in the axial direction with a simple structure, to which the tool holder is detachably attached.

DETAILED DESCRIPTION

First Embodiment

Figure 1:
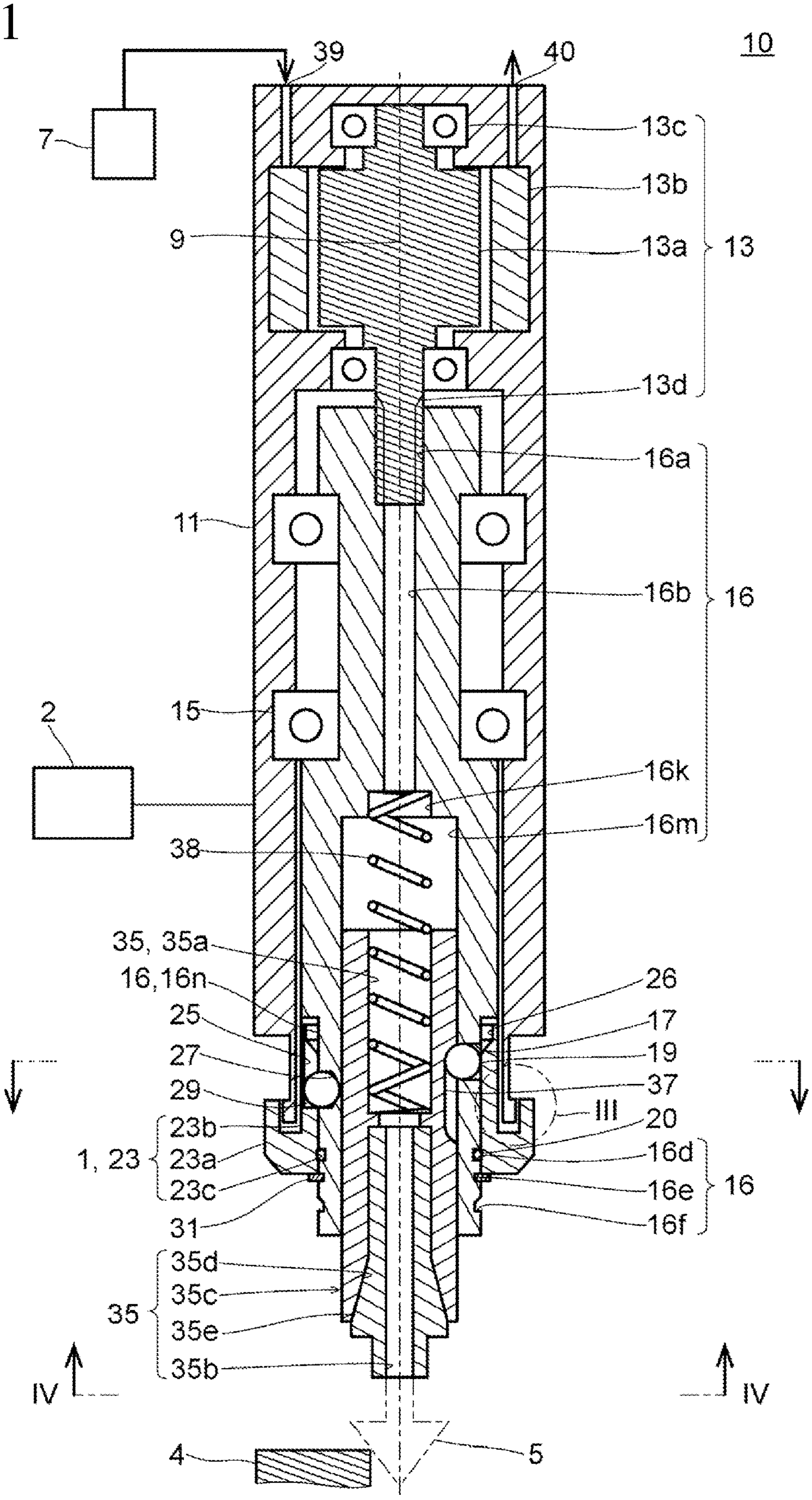
FIG. 1 is a longitudinal sectional view of a processing tool during processing according to a first embodiment.
Figure 2:
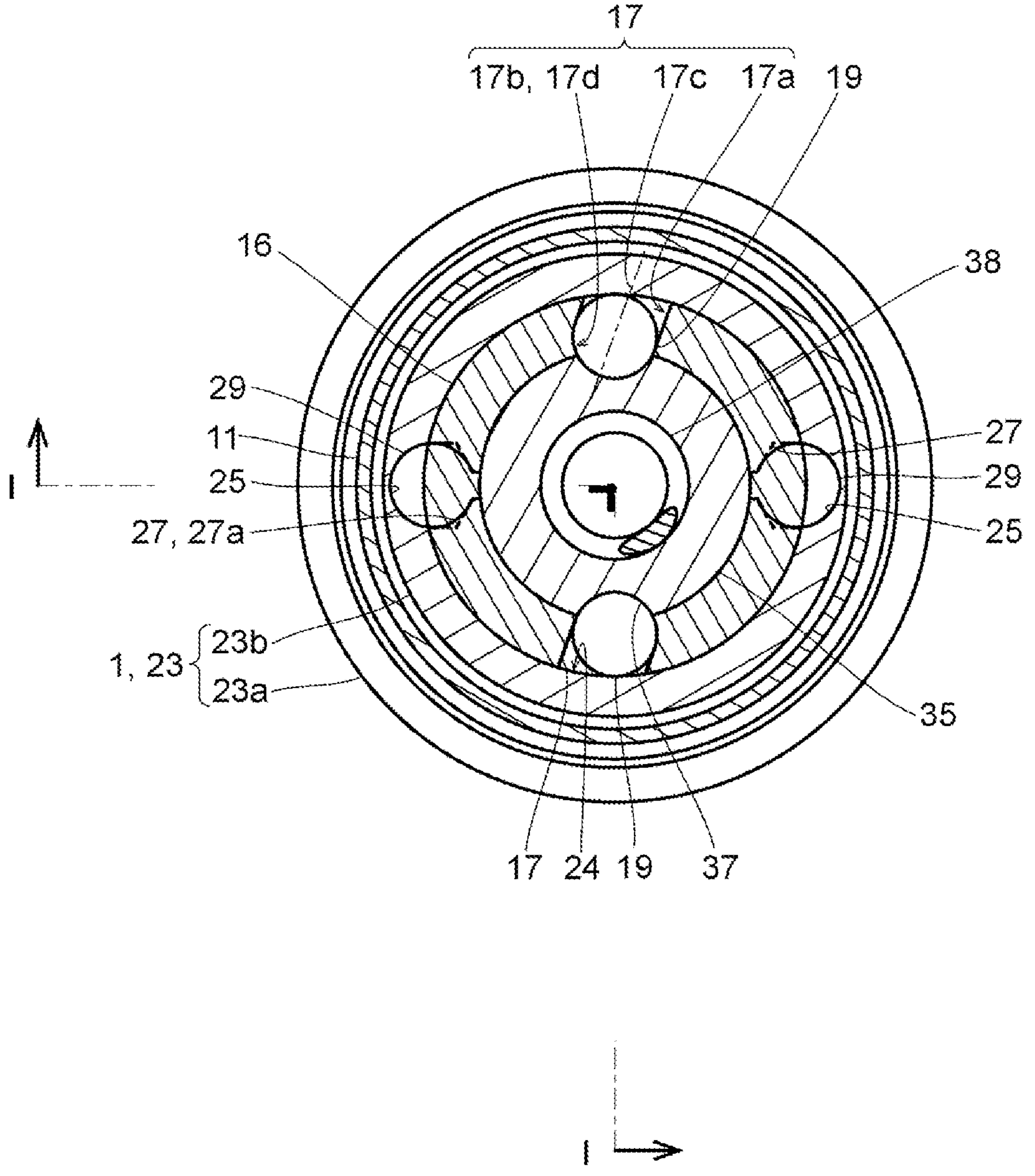
FIG. 2 is an enlarged cross-sectional view taken along line II-II in FIG. 1.
Figure 3:
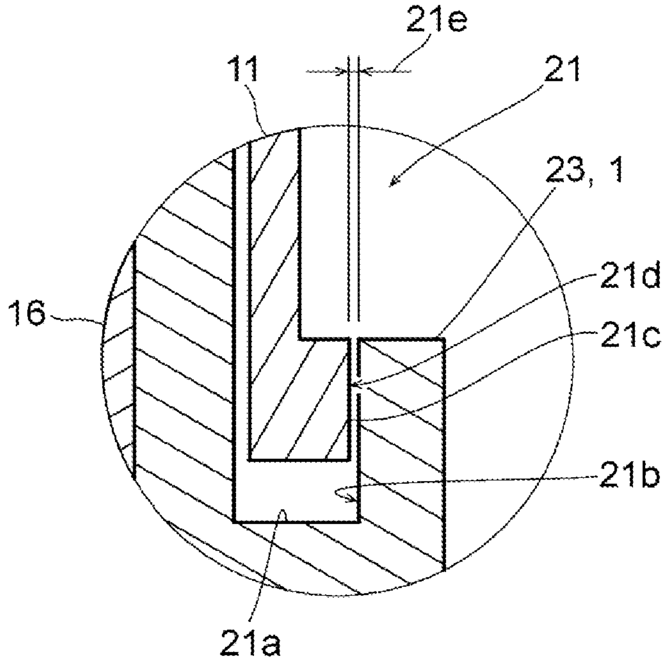
FIG. 3 is an enlarged view showing portion indicated as III in FIG. 1.

As shown in FIGS. 1 to 3, a processing tool 10 according to the present embodiment includes a body 11, a main bearing 15, a spindle 16, a coil spring (elastic member) 38, a cover 23, a tool holder 35, and a first ball (first anti-rotation body) 19. The processing tool 10 may include a motor 13, a second ball (second anti-rotation body) 29, a packing 20, a retaining ring 31, an inlet port (pressurized air inlet) 39, and an outlet port (exhaust port) 40. A tool 5 is attached to the tool holder 35.

FIG. 1 is a cross-sectional view taken along combination line I-I in FIG. 2. For convenience, a downward direction in FIG. 1 is referred to as a distal end, and an upward direction is referred to as a basal end.

The body 11 has a hollow right cylindrical shape having a center axis 9. The body 11 is a casing of the motor 13 and the spindle 16. The body 11 is a shank of the processing tool 10. For example, a robot 2 grips and moves the body 11 to perform deburring or the like on the workpiece 4 with the tool 5 brought into contact with the workpiece 4. The inlet port 39 is located at the basal end of the body 11. The outlet port 40 is located at the basal end of the body 11.

The motor 13 is an air motor. The motor 13 includes a bearing 13*c*, a stator 13*b*, a rotor 13*a*, and an output shaft 13*d*. For example, the motor 13 is embedded in the basal end portion of the body 11. The bearing 13*c* is disposed in the body 11 to support the rotor 13*a*. The rotor 13*a* is fastened to the output shaft 13*d* and rotates integrally with the output shaft 13*d*. The output shaft 13*d* is, for example, a serration shaft. The stator 13*b* is embedded in the body 11. The stator 13*b* is connected to the inlet port 39 and the outlet port 40.

The motor 13 may be an electric motor. At this time, the outlet port 40 may be omitted. The inlet port 39 may be connected to a distal end of the motor 13.

The motor 13 may be detachably disposed outside the body 11.

The spindle 16 is supported inside the body 11 with the main bearing 15. The spindle 16, which has a right cylindrical shape, is disposed with a center at a center axis 9. The spindle 16 has a tool holder holding hole 16*m* and a plurality (two in the present embodiment) of first ball holding holes (first anti-rotation body holding holes) 17. The spindle 16 may include a serration hole 16*a*, a communication hole 16*b*, a plurality (two in the present embodiment) of second ball holding holes (second anti-rotation body holding holes) 27, a second spring holding hole 16*k*, a first packing groove 16*d*, a first retaining ring groove 16*e*, a second retaining ring groove 16*f*, and a small-diameter portion 16*n*.

The tool holder holding hole 16*m*, which opens to the distal end of the spindle 16, is located with a center at the center axis 9. The tool holder holding hole 16*m* is a bottomed right cylindrical hole. A cylindrical surface of the tool holder holding hole 16*m* is formed smoothly. The second spring holding hole 16*k*, which is a bottomed right cylindrical hole, is located at the bottom of the tool holder holding hole 16*m*.

The serration hole 16*a* is located at a basal end of the spindle 16 with a center at the center axis 9. The serration hole 16*a* is fastened to the output shaft 13*d*. The communication hole 16*b* extends, for example, along the center axis 9 to communicate the serration hole 16*a* and the tool holder holding hole 16*m*. The communication hole 16*b* may be communicated to the second spring holding hole 16*k*.

The small-diameter portion 16*n* is disposed at a distal end portion of the spindle 16. The small-diameter portion 16*n* has a smaller outer diameter than a middle portion. The outer surface of the small-diameter portion 16*n* has a radius substantially equal to a distance from the center axis 9 to the outermost surface of the first ball 19.

The second retaining ring groove 16*f*, the first retaining ring groove 16*e*, and the first packing groove 16*d* are arranged on the outer cylindrical surface of the spindle 16 in this order from the distal end of the spindle 16. The second retaining ring groove 16*f*, the first retaining ring groove 16*e*, and the first packing groove 16*d* each is a circumferential groove having a square cross section. Preferably, the second retaining ring groove 16*f* has an inclined portion having a larger diameter toward the basal end.

The first ball holding hole 17 is located at the distal end portion of the spindle 16. The first ball holding hole 17 is located closer to the basal end than the first retaining ring groove 16*e* in the axial direction. Preferably, the first ball holding hole 17 is located closer to the basal end than the first packing groove 16*d* in the axial direction. The first ball holding hole 17 penetrates from the outer surface of the spindle 16 to the tool holder holding hole 16*m*.

The second ball holding hole 27 is located on the outer surface of the distal end portion of the spindle 16. The second ball holding hole 27 is located closer to the basal end than the first retaining ring groove 16*e* in the axial direction. Preferably, the second ball holding hole 27 is located closer to the basal end than the first packing groove 16*d* in the axial direction. The second ball holding hole 27 extends in the radial direction of the spindle 16. Preferably, the second ball holding hole 27 has a second ball retaining portion (second anti-rotation body retaining portion) 27*a*. The second ball retaining portion 27*a* prevents the second ball 29 from falling into the tool holder holding hole 16*m* when the tool holder 35 is removed. The second ball holding hole 27 may penetrate the spindle 16.

As shown in FIG. 2, the first ball holding hole 17 has a ball holding surface (first anti-rotation body holding surface) 17*a*, a first ball retaining portion 17*b*, a center axis 17*c*, and a retaining spherical surface 17*d*. The first ball holding hole 17, which is a right cylindrical hole, is inclined in a circumferential direction with respect to the radial direction. The first ball holding hole 17 extends on a cross section of the spindle 16. The center axis 17*c* of the first ball holding hole 17 is in a twisted position with the center axis 9. That is, the center axis 17*c* does not intersect the center axis 9.

The ball holding surface (first anti-rotation body holding surface) 17*a* is a cylindrical surface of the first ball holding hole 17. The ball holding surface 17*a* has a diameter substantially equal to the diameter of the first ball 19. The first ball retaining portion 17*b*, which is located radially inward of the first ball holding hole 17, has the retaining spherical surface 17*d*. The retaining spherical surface 17*d* intersects the cylindrical surface of the tool holder holding hole 16*m*. The retaining spherical surface 17*d* has a diameter equal to the diameter of the ball holding surface 17*a*. A plurality of the first ball holding holes 17 are located rotationally symmetrically with respect to the center axis 9.

The first ball 19 is held inside the first ball holding hole 17. When the cover 23 is at a processing position 1, the outermost surface of the first ball 19 comes into contact with a pressing surface 24 as viewed from the center axis 9. Then, the first ball 19 comes into contact with the retaining spherical surface 17*d*. At this time, the first ball 19 partially protrudes radially inward of the tool holder holding hole 16*m*. Preferably, about 10% to 40% of the radius of the first ball 19 protrudes from the inner surface of the tool holder holding hole 16*m*.

Instead of the first ball 19, a pin extending in the center axis 17*c* of the first ball holding hole 17 may be used. The distal end surface of the first anti-rotation body 19, which is a pin, may be a flat surface instead of a spherical surface.

The second ball 29 is held inside the second ball holding hole 27. The second ball 29 is housed between the second ball groove 25 and the second ball holding hole 27.

Instead of the second ball 29, a pin extending in the radial direction may be used. The distal end surface of the second anti-rotation body 29, which is a pin, may be a flat surface instead of a spherical surface.

As shown in FIG. 1, the cover 23 includes a relief portion 26. The cover 23 may include an umbrella portion 23*a*, a shaft portion 23*b*, a second ball groove (second anti-rotation groove) 25, and a second packing groove 23*c*.

The umbrella portion 23*a* covers the distal end portion of the body 11. The shaft portion 23*b* is disposed at a basal end of the umbrella portion 23*a*. The relief portion 26 is located at a basal end of the cover 23. The shaft portion 23*b* is a hollow right cylinder. An inner surface of the shaft portion 23*b* is a pressing surface 24. The pressing surface 24 has a diameter substantially equal to the diameter of the small-diameter portion 16*n*. When the cover 23 is at the processing position 1, the first ball 19 abuts against the pressing surface 24.

For example, the relief portion 26 is a circumferential groove having a trapezoidal cross-section. In other words, an inner diameter of the shaft portion 23*b* is enlarged in the relief portion 26. The relief portion 26 may open to the basal end surface of the cover 23. The relief portion 26 is located on the basal end side of the pressing surface 24.

The second ball groove 25 extends parallel to the spindle 16. For example, the second ball groove 25 has a semicircular cross section. The second ball grooves 25 are located rotationally symmetrically with respect to the center axis 9.

The second packing groove 23*c* is located inside the shaft portion 23*b*. The second packing groove 23*c* aligns with the first packing groove 16*d* in the axial direction when the cover 23 is at the processing position 1. For example, the second packing groove 23*c* has a groove depth smaller than the groove depth of the first packing groove 16*d*.

The second ball groove 25 may have a spiral shape that twists as it advances towards the distal.

As shown in FIG. 3, the cover 23 may include an expansion chamber 21*a*. The expansion chamber 21*a* is a circumferential groove having a rectangular cross section that opens to the basal end surface of the cover 23. The expansion chamber 21*a* has a smooth inner cylindrical surface 21*b*.

The body 11 may include a labyrinth fin 21*c*. The labyrinth fin 21*c* is a hollow-cylinder having a rectangular cross-section disposed at the distal end of the body 11. The labyrinth fin 21*c* protrudes radially outward of the body 11. The labyrinth fin 21*c* has a smooth outer cylindrical surface 21*d*. When the cover 23 is at the processing position 1, the labyrinth fin 21*c* is inserted into the expansion chamber 21*a*. At this time, the outer cylindrical surface 21*d* and the inner cylindrical surface 21*b* face each other with a slight gap 21*e* therebetween. The front end surface of the labyrinth fin 21*c* and the bottom surface of the expansion chamber 21*a* have a sufficiently larger distance than the gap 21*e*. The labyrinth fin 21*c* and the expansion chamber 21*a* constitute an axial labyrinth seal. Pressurized air expands in the expansion chamber 21*a* and is discharged from the slight gap 21*e*. This causes turbulence in the expansion chamber 21*a* and further increases the discharge rate. Then, entry of foreign matter, steam, or moisture from the gap between the cover 23 and the body 11 is suppressed.

The tool holder 35 includes a first spring holding hole 35*a*, a tool holding hole 35*b*, an outer cylindrical surface 35*c*, and a first ball groove (first anti-rotation groove) 37. The tool holder 35 has a right cylindrical shape. The outer cylindrical surface 35*c* slides with the tool holder holding hole 16*m*. The tool holder 35 may include a tapered hole 35*d*, and a collet 35*e*.

The first ball groove 37, which is located on the outer cylindrical surface 35*c*, extends along the spindle 16. The first ball groove 37 has a semicircular cross section. Both end portions 37*a* (see FIG. 5) of the first ball groove 37 are, for example, hemispherical. The plurality of first ball grooves 37 are located rotationally symmetrically with respect to the center axis 9.

The first spring holding hole 35*a*, which opens into the basal end face of the tool holder 35, extends along the center axis 9. The first spring holding hole 35*a* is a cylindrical hole. The first spring holding hole 35*a* has an inner diameter substantially equal to the outer diameter of the coil spring 38.

The tool holding hole 35*b*, which opens into the distal end face of the tool holder 35, extends along the center axis 9. The tool holding hole 35*b* has the same diameter as the shank diameter of the tool 5. For example, the tool holding hole 35*b* is a cylindrical hole. The tool 5 having a straight shank is attached in the tool holding hole 35*b*.

The tapered hole 35*d*, which is a frustoconical hole, extends along the center axis 9. For example, the tapered hole 35*d* has an internal thread at its basal end. The collet 35*e*, which is frustoconical shape, fits into the tapered hole 35*d*. The collet 35*e* has, for example, a slit or an external thread, and is fastened to the tapered hole 35*d*. Accordingly, the inner diameter of the collet 35*e* is reduced, and the tool 5 is fastened.

The first ball groove 37 may have a spiral shape twisted in the rotation direction of the spindle 16 as it advances toward the distal end. For example, the lead angle of the spiral is between 60 degrees and 80 degrees.

Figure 4:
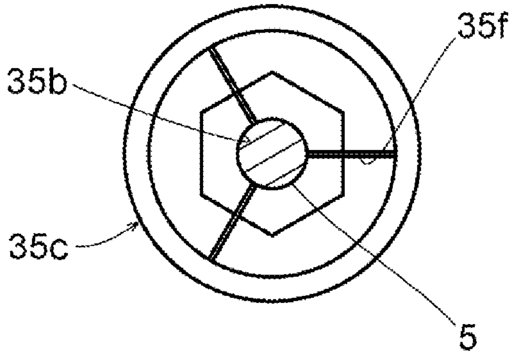
FIG. 4 is an enlarged cross-sectional view taken along line IV-IV in FIG. 1.

As shown in FIG. 4, the tool holder 35 may have an airflow path 35*f*. For example, the airflow path 35*f* may be a slit of the collet 35*e*. The airflow path 35*f* opens to the distal end portion of the tool holder 35 to be connected to the tool holder holding hole 16*m*. The pressurized air is ejected from the distal end of the tool holder 35 toward the tool 5 for cooling the tool 5. The pressurized air is discharged from the gap between the tool holder holding hole 16*m* and the outer cylindrical surface 35*c* of the tool holder 35. This suppresses foreign matter, steam, moisture, and the like from entering the tool holder holding hole 16*m*.

The coil spring 38 is a compression coil spring. Instead of the coil spring 38, an elastic spring such as a three-dimensional spring structure may be used. The coil spring 38 urges the tool holder 35 toward the distal end. The coil spring 38 is guided by the first spring holding hole 35*a* and the second spring holding hole 16*k*.

The packing 20 is a ring-shaped packing such as an O-ring. The packing 20 seals a gap between the spindle 16 and the cover 23.

The retaining ring 31 is an annular ring. The retaining ring 31 is, for example, a partially cut metal ring. The retaining ring 31 is, for example, a concentric retaining ring. The retaining ring 31 is attached in the first retaining ring groove 16*e* or the second retaining ring groove 16*f*. The retaining ring 31 attached in the first retaining ring groove 16*e* holds the cover 23 at the processing position 1. The retaining ring 31 prevents the cover 23 from unintentionally moving to the detachable position 3 and falling off from the spindle 16.

When the motor 13 rotates, the rotation of the output shaft 13*d* is transmitted to the spindle 16 via the serration hole 16*a*. The rotation of the spindle 16 is then transmitted to the tool holder 35 via the first ball groove 37 and the first ball 19 held by the first ball holding hole 17. Further, the rotation of the spindle 16 is transmitted to the cover 23 by the second ball groove 25 and the second ball 29 held by the second ball holding hole 27. Then, the spindle 16, the tool holder 35, the tool 5, and the cover 23 rotate integrally.

The robot 2 moves the processing tool 10 to press the tool 5 against the workpiece 4. When the tool 5 contacts the workpiece 4, the tool 5 receives a thrust force from the workpiece 4. The first ball 19 then moves relatively inside the first ball groove 37 to move the tool holder 35 toward the basal end. The tool holder 35 reaches a position where the thrust force received from the workpiece 4 and the restoring force of the coil spring 38 are balanced. The workpiece 4 has a machining error and a manufacturing error, and the positions and heights of objects to be removed such as burrs are different from each other. The processing tool 10 automatically adjusts the positional relationship between the tool 5 and the object of the workpiece 4 to be removed by expanding and contracting the tool holder 35 even when the positions of the object of the workpiece 4 to be removed are different. This allows to finish the workpiece 4 substantially the same. Further, even when the size of the object of the workpiece 4 to be removed or the height of the surface of the workpiece 4 varies, the trajectory of the tool 5 can follow the size of the object of the workpiece 4 to be removed or the height of the surface of the workpiece 4.

Figure 5:
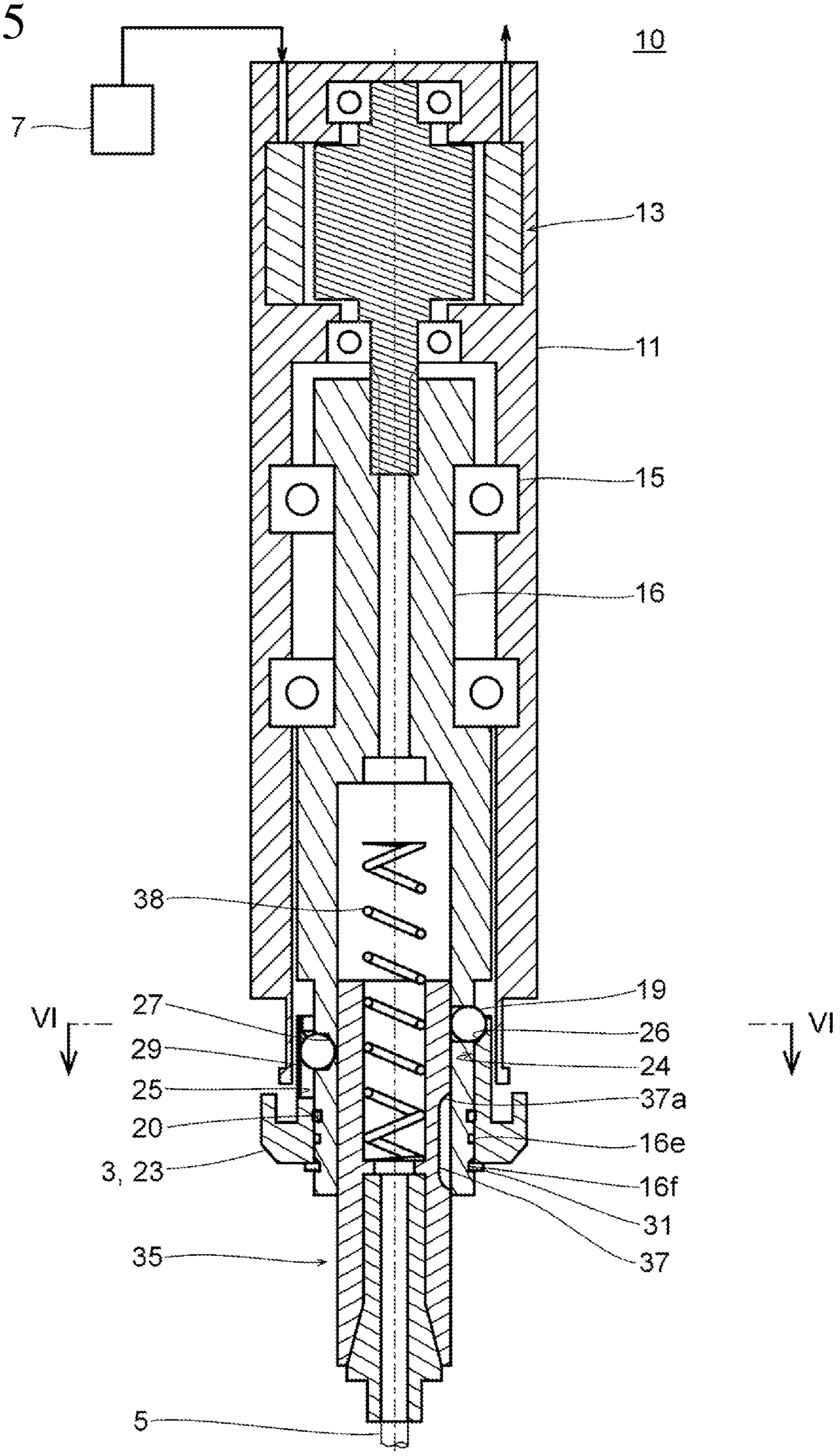
FIG. 5 is a longitudinal sectional view of the processing tool according to the first embodiment at the time of attaching or detaching the tool.
Figure 6:
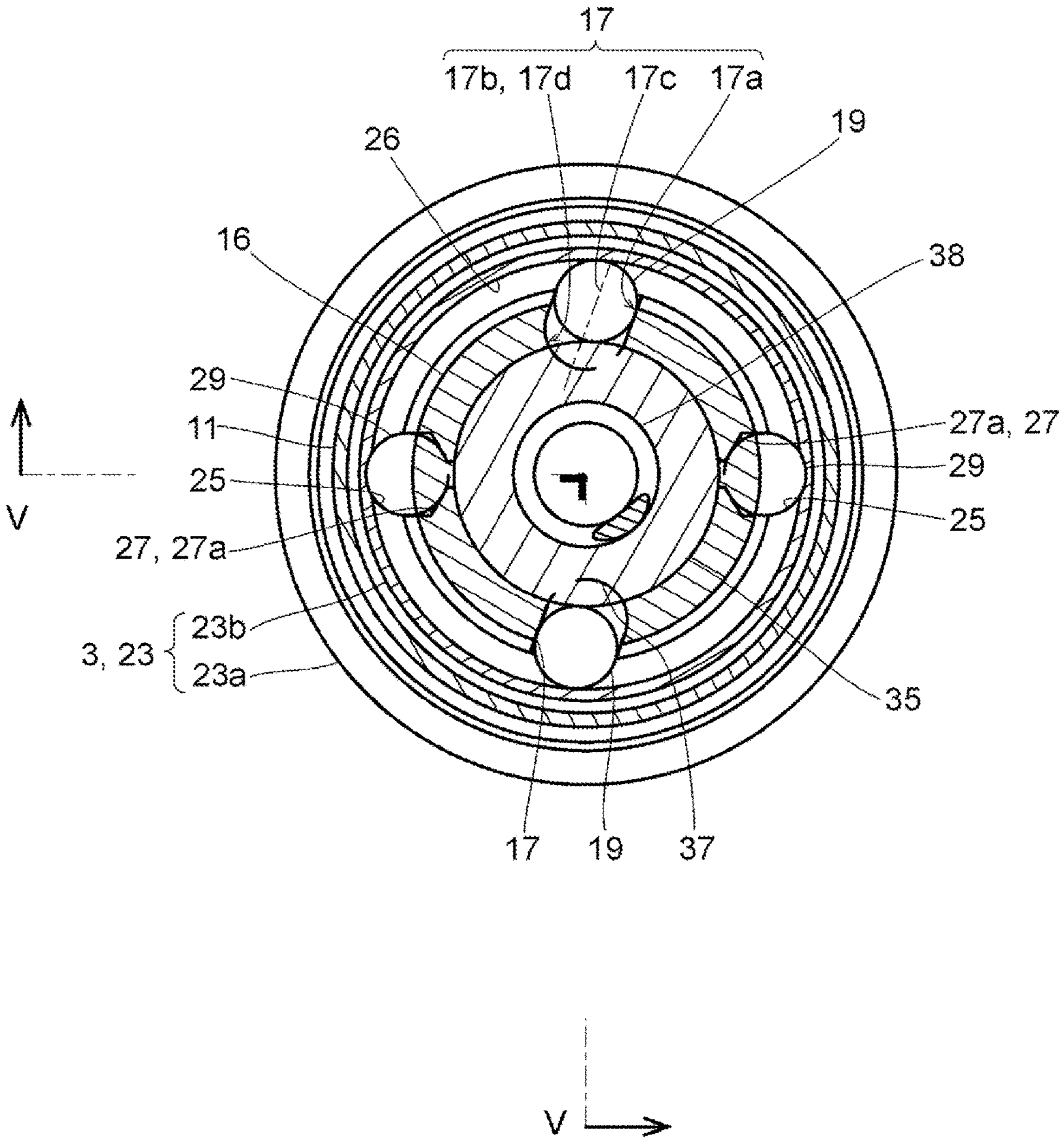
FIG. 6 is a cross-sectional view taken along line VI-VI in FIG. 5.

With reference to FIGS. 5 and 6, the processing tool 10 in the detachable state of the tool holder 35 will be described. FIG. 5 is a combined cross-sectional view taken along line V-V in FIG. 6.

The operator or the robot 2 moves the retaining ring 31 in the second retaining ring groove 16*f*. The operator or the robot 2 then moves the cover 23 from the processing position 1 toward the distal end. At this time, the cover 23 comes into contact with the retaining ring 31 to stop at the detachable position 3.

The second ball groove 25 extends parallel to the spindle 16. The cover 23 is guided by the second ball groove 25 and the second ball 29 held in the second ball holding hole 27 to move toward the distal end along the spindle 16 without rotating.

The tool holder 35 is urged by a coil spring 38 toward the distal end. The end portion 37*a* of the first ball groove 37 is spherical, and the longitudinal cross-section of the end portion 37*a* is inclined from the center axis 9. Thus, when the tool holder 35 is pushed out, the first ball 19 receives the component of the elastic force of the coil spring 38 directed radially outward from the end portion 37*a*. When the cover 23 is at the detachable position 3, the relief portion 26 is located on the extension of the first ball holding hole 17. As shown in FIG. 6, the first ball 19 thus moves radially outward along the first ball holding hole 17 to be accommodated in the relief portion 26. At this time, the first ball 19 moves outward of the cylindrical surface of the tool holder holding hole 16*m* to come out of the first ball groove 37. The coil spring 38 continues to urge the tool holder 35 toward the distal end for the tool holder 35 to come out of the spindle 16.

The first ball holding hole 17 has a first ball retaining portion 17*b*. Thus, even when the tool holder 35 is removed from the spindle 16, the first ball 19 does not fall into the tool holder holding hole 16*m*.

The second ball holding hole 27 has a second ball retaining portion 27*a*. Thus, even when the tool holder 35 is removed from the spindle 16, the second ball 29 does not fall into the tool holder holding hole 16*m*. The second ball 29 and the second ball groove 25 define the rotation direction of the cover 23*s*.

The operator or the robot 2 inserts the coil spring 38 into the first spring holding hole 35*a* to insert the tool holder 35 into the tool holder holding hole 16*m*. When the phases of the first ball groove 37 and the first ball 19 coincide with each other in the rotation direction, the operator or the robot 2 can move the cover 23 from the detachable position 3 to the processing position 1. The operator or the robot 2 can move the retaining ring 31 in the first retaining ring groove 16*e* when the cover 23 is at the processing position 1.

The processing tool 10 according to the present embodiment allows the tool holder 35 to be easily removed from the spindle 16. Thus, the tool 5 can be attached to the tool holder 35 or the length of the tool 5 can be measured apart from the processing tool 10. As the replacement of the tool 5 can be performed in an external setup, the tool 5 can be quickly replaced, and the stopping time of the production line associated with the replacement of the tool 5 can be shortened.

The cover 23 and the spindle 16 rotate integrally with each other by the second ball 29. This suppresses wear of the cover 23 and the spindle 16 caused by the relative rotation of the cover 23 and the spindle 16.

When the tool holder 35 is detached, the retaining ring 31 is moved in the second retaining ring groove 16*f*. Thus, even when the operator forgets to move the retaining ring 31 in the first retaining ring groove 16*e*, the retaining ring 31 is attached in the second retaining ring groove 16*f*, which prevents the cover 23 from falling off.

The cover 23 does not receive an external force in the axial direction. When the spindle 16 is rotated, the packing 20 is brought into close contact with the second packing groove 23*c* and the shaft portion 23*b* by centrifugal force. Thus, the packing 20 suppresses the cover 23 from moving with respect to the spindle 16. Thus, even if the operator forgets to return the retaining ring 31 to the first retaining ring groove 16*e*, the tool holder 35 does not fall off from the tool holder holding hole 16*m* when the motor 13 rotates the spindle 16.

Second Embodiment

Figure 7:
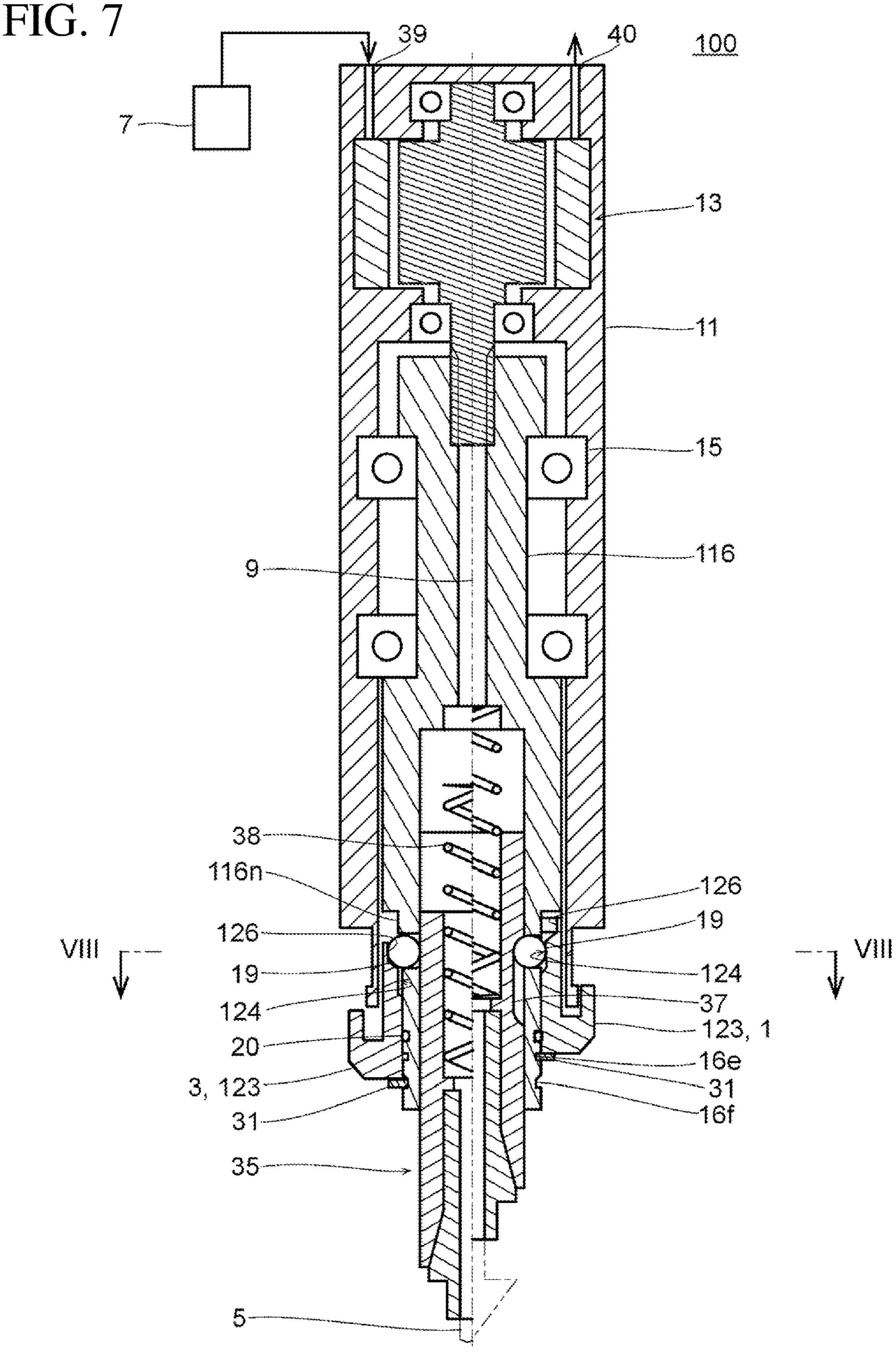
FIG. 7 is a longitudinal sectional view of a processing tool according to the second embodiment.
Figure 8:
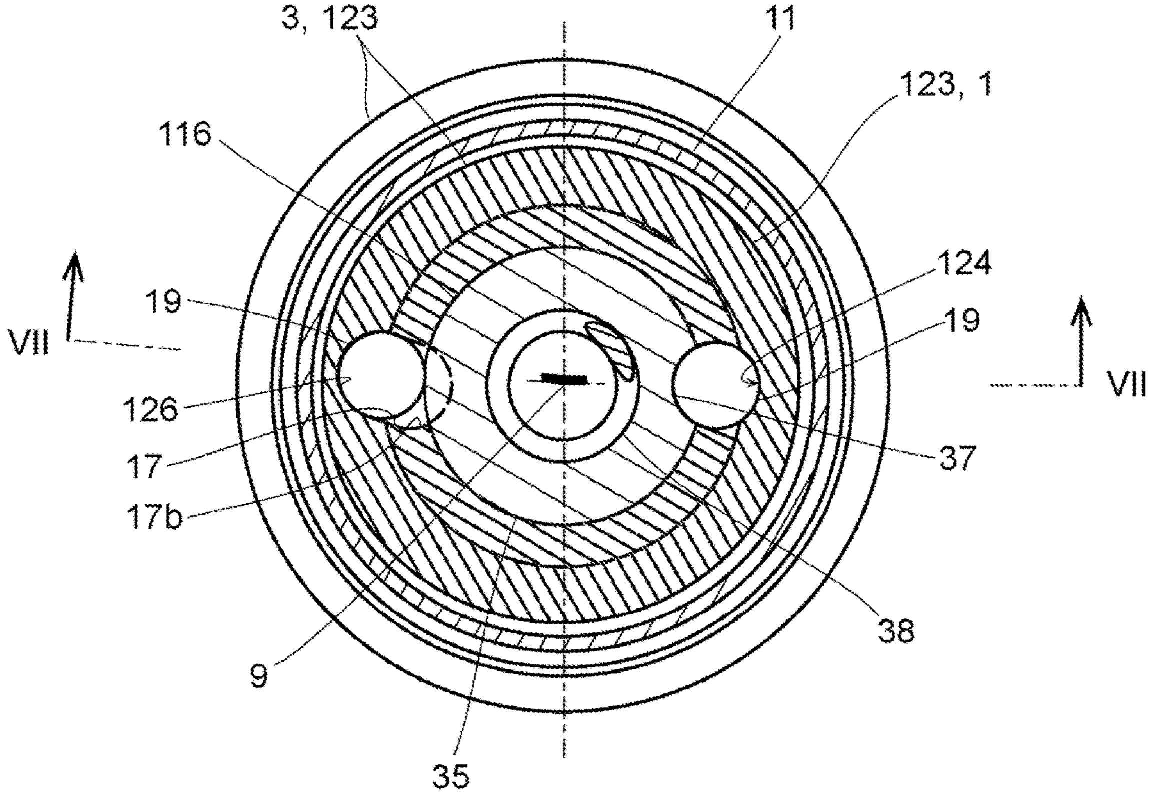
FIG. 8 is an enlarged cross-sectional view taken along line VIII-VIII in FIG. 7.

As shown in FIGS. 7 and 8, a processing tool 100 according to the present embodiment includes a body 11, a motor 13, a main bearing 15, a spindle 116, a cover 123, a first ball 19, and a tool holder 35.

FIG. 7 is a combined cross-sectional view taken along line VII-VII in FIG. 8. In FIGS. 7 and 8, the right half from the center axis 9 shows a state in which the cover 123 is at a processing position 1. In FIGS. 7 and 8, the left half from the center axis 9 shows a state in which the cover 123 is at a detachable position 3.

The spindle 116 has a small-diameter portion 116*n*. The outer surface of the small-diameter portion 116*n* has a radius smaller than a distance from the center axis 9 to the outermost surface of the first ball 19. When the cover 123 is at the processing position 1, the first ball 19 protrudes radially outward from the small-diameter portion 116*n* when viewed from the center axis 9.

The cover 123 has a pressing surface 124 and a relief portion 126. The inner surface of the cover 123 slides with the small-diameter portion 116*n*. The pressing surface 124 and the relief portion 126 extend parallel to the spindle 16. The pressing surface 124 and the relief portion 126 form a continuous longitudinal groove. The pressing surface 124 and the relief portion 126 have a substantially semi-circular cross-section.

When the cover 123 is at the processing position 1, the pressing surface 124 abuts the first ball 19. As shown in FIG. 8, when the cover 123 is at the processing position 1, the cross section of the pressing surface 124 and the first ball groove 37 is a circle having substantially the same diameter as the first ball 19.

The relief portion 126 has substantially the same shape as a trajectory of the first ball 19 until a distance between a surface of the first ball 19 and the center axis 9 reaches the radius of the tool holder holding hole 16*m* by moving the first ball 19 radially outward along the first ball holding hole 17, while moving the cover 123 from the processing position 1 to the detachable position 3. As shown in FIG. 8, the cross section of the relief portion 126 coincides with the cross section of the first ball 19 when the first ball 19 is released from the tool holder holding hole 16*m* along the first ball holding hole 17. As shown in FIG. 7, the relief portion 126 and the pressing surface 124 are smoothly connected to each other.

The configuration of the processing tool 100 other than the above is substantially the same as the processing tool 10 of the first embodiment.

When the operator or the robot 2 moves the cover 123 from the processing position 1 to the detachable position 3, the tool holder 35 is pushed out by the coil spring 38. The first ball 19 is thus released radially outward as viewed from the spindle 116 along the first ball holding hole 17, and is accommodated in the relief portion 126. As the first ball 19 moves outward of the tool holder holding hole 16*m*, the operator or the robot 2 detachably attaches the tool holder 35.

According to the present embodiment, when the cover 123 moves from the processing position 1 to the detachable position 3, the first ball 19 moves in the vertical groove including the pressing surface 124 and the relief portion 126 which are integrally formed. Thus, the rotational phase of the cover 123 and the spindle 116 is not shifted by the first ball 19, the pressing surface 124, and the relief portion 126. The phases of the spindle 116 and the cover 23 are thus maintained even without the second anti-rotation body.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

5 Tool
10, 100 Processing tool
11 Body
16, 116 Spindle
17 First ball holding hole (First anti-rotation boy holding hole)
19 First ball (First anti-rotation body)
23, 123 Cover
24, 124 Pressing surface
26, 126 Relief portion
35 Tool holder
38 Coil spring (elastic member)

What is claimed is:

1. A processing tool, comprising:
a body;
a spindle rotatably supported by the body, the spindle including
a tool holder holding hole having an opening toward distal end, the tool holder holding hole extending along the spindle, and
a first anti-rotation body holding hole radially penetrating the spindle,
a tool holder detachably inserted into the tool holder holding hole, the tool holder including a first anti-rotation groove located on an outer surface of the tool holder to which a tool is attached;
an anti-rotation body held in the first anti-rotation body holding hole;
a cover disposed at a distal end portion of the spindle, the cover configured to reciprocate along the spindle between a processing position and a detachable position, the cover located at the processing position configured to have the anti-rotation body protrude in the first anti-rotation groove, and the cover located at the detachable position configured to accommodate the anti-rotation body; and
an elastic member disposed between the tool holder and the tool holder holding hole to urge the tool holder toward distal end,
wherein
the spindle includes a first packing groove,
the cover includes a second packing groove on an inner surface of the cover, the second packing groove axially aligned with the first packing groove when the cover is located at the processing position,
the processing tool further comprising:
a packing disposed in the first packing groove to seal a gap between the spindle and the cover, the packing configured to expand radially outward by centrifugal force to be engaged with the second packing groove when the processing tool rotates such that the packing suppresses the cover from moving with respect to the spindle.

2. The processing tool according to claim 1, wherein
the cover includes
a pressing surface configured to cover the first anti-rotation body holding hole at the processing position, and
a relief portion located on an inner surface of the cover, the relief portion being recessed radially outward,
the anti-rotation body received between the first anti-rotation body holding hole and the first anti-rotation groove when the cover is located at the processing position, and the anti-rotation body is accommodated in the relief portion when the cover is located at the detachable position and the tool holder is removed from the tool holder holding hole.

3. The processing tool according to claim 2, wherein
the cover has an opening extending toward a basal end, the cover includes an expansion chamber that is an annular groove having an inner cylindrical surface,
the body includes an annular labyrinth fin located at a distal end portion, the labyrinth fin having an outer cylindrical surface, the labyrinth fin is inserted into the expansion chamber to form a gap between the inner cylindrical surface and the outer cylindrical surface when the cover is located at the processing position.

4. The processing tool according to claim 2, wherein
the spindle includes a first retaining ring groove located on an outer surface of a distal end portion of the spindle,
the processing tool further comprising:
a retaining ring disposed in the first retaining ring groove to retain the cover at the processing position when located in the first retaining ring groove.

5. The processing tool according to claim 1, wherein
the spindle includes a first retaining ring groove located on an outer surface of a distal end portion of the spindle,
the processing tool further comprising:
a retaining ring disposed in the first retaining ring groove to retain the cover at the processing position when located in the first retaining ring groove.

6. The processing tool according to claim 5, wherein
the spindle includes a second retaining ring groove located on the outer surface of the distal end portion of the spindle, the second retaining ring groove located toward the distal end from the first retaining ring groove, and
the retaining ring is movable between the first retaining ring groove and the second retaining ring groove to retain the cover at the detachable position when the retaining ring is located in the second retaining ring groove.

7. The processing tool according to claim 1, wherein
the first anti-rotation groove extends parallel to the spindle.

8. The processing tool according to claim 1, further comprising:
a motor disposed in the body to rotate the spindle.

9. The processing tool according to claim 1, wherein
the spindle includes
a first anti-rotation body holding surface configured to hold the anti-rotation body at the first anti-rotation body holding hole, and
a first anti-rotation body retaining portion located on the first anti-rotation body holding surface to prevent the anti-rotation body from falling off.

10. The processing tool according to claim 9, wherein
the first anti-rotation body retaining portion includes a retaining spherical surface in conformity with the anti-rotation body.

11. The processing tool according to claim 1, wherein
the tool is detachably attached to the tool holder.

12. A processing tool, comprising:
a body;
a spindle rotatably supported by the body, the spindle including
a tool holder holding hole having an opening toward distal end, the tool holder holding hole extending along the spindle, and
a first anti-rotation body holding hole radially penetrating the spindle,
a tool holder detachably inserted into the tool holder holding hole, the tool holder including a first anti-rotation groove located on an outer surface of the tool holder to which a tool is attached;
an anti-rotation body held in the first anti-rotation body holding hole;
a cover disposed at a distal end portion of the spindle, the cover configured to reciprocate along the spindle between a processing position and a detachable position, the cover located at the processing position configured to have the anti-rotation body protrude in the first anti-rotation groove, and the cover located at the detachable position configured to accommodate the anti-rotation body; and
an elastic member disposed between the tool holder and the tool holder holding hole to urge the tool holder toward distal end, wherein
the cover has an opening extending toward a basal end, the cover includes an expansion chamber that is an annular groove having an inner cylindrical surface,
the body includes an annular labyrinth fin located at a distal end portion, the labyrinth fin having an outer cylindrical surface, the labyrinth fin is inserted into the expansion chamber to form a gap between the inner cylindrical surface and the outer cylindrical surface when the cover is located at the processing position.

13. The processing tool according to claim 12, wherein
the body includes a pressurized air inlet configured to supply pressurized air into the body, and
the pressurized air supplied from the pressurized air inlet is discharged from the gap.

14. A processing tool, comprising:
a body;
a spindle rotatably supported by the body, the spindle including
a tool holder holding hole having an opening toward distal end, the tool holder holding hole extending along the spindle, and
a first anti-rotation body holding hole radially penetrating the spindle,
a tool holder detachably inserted into the tool holder holding hole, the tool holder including a first anti-rotation groove located on an outer surface of the tool holder to which a tool is attached;
an anti-rotation body held in the first anti-rotation body holding hole;
a cover disposed at a distal end portion of the spindle, the cover configured to reciprocate along the spindle between a processing position and a detachable position, the cover located at the processing position configured to have the anti-rotation body protrude in the first anti-rotation groove, and the cover located at the detachable position configured to accommodate the anti-rotation body; and
an elastic member disposed between the tool holder and the tool holder holding hole to urge the tool holder toward distal end, wherein
the spindle includes a second anti-rotation body holding hole located on an outer surface,
the cover includes a second anti-rotation groove located on an inner surface of the cover along the spindle,
the processing tool further comprises:
a second anti-rotation body held in the second anti-rotation body holding hole in a movable manner between the second anti-rotation body holding hole and the second anti-rotation groove.

15. The processing tool according to claim 14, wherein
the second anti-rotation groove extends parallel to the spindle.

* * * * *